Jan. 3, 1950          G. L. GODWIN                    2,492,982
                    DIRECT-CURRENT MACHINE
Filed Sept. 12, 1946                          2 Sheets—Sheet 1

WITNESSES:
E. A. M'Closkey.
C. M. Avery

INVENTOR
Gurney L. Godwin.
BY
Paul C. Friedemann
ATTORNEY

Jan. 3, 1950  G. L. GODWIN  2,492,982
DIRECT-CURRENT MACHINE
Filed Sept. 12, 1946  2 Sheets-Sheet 2

WITNESSES:
E.A. McCloskey
C. M. Avery

INVENTOR
Gurney L. Godwin.
BY
Paul E. Friedemann
ATTORNEY

Patented Jan. 3, 1950

2,492,982

UNITED STATES PATENT OFFICE 2,492,982

DIRECT-CURRENT MACHINE

Gurney L. Godwin, Wilkinsburg, Pa., assignor to Westinghouse Electric Corporation, East Pittsburgh, Pa., a corporation of Pennsylvania Application September 12, 1946, Serial No. 696,575

11 Claims. (Cl. 171—228)

My invention relates to rotary direct-current machines of the plural-stage amplifying type disclosed in the copending applications of A. W. Kimball and W. R. Harding, Serial No. 607,440, filed July 27, 1945, now Patent No. 2,484,835, and of M. Liwschitz and A. W. Kimball, Serial No. 682,188, filed July 9, 1946, now Patent No. 2,484,840, both assigned to the assignee of the present invention.

In machines of this type, the input excitation is applied to a lesser number of machine poles to provide a controlled distortion or unbalance of the magnetic flux distribution in the multipole field structure of the machine, and thereby causes circulating currents to flow between interconnected groups of equipolar commutator brushes; and these internal circulating currents serve, in one or several amplifying stages, for providing or controlling the multi-pole main field excitation of the machine. Aside from the input or signal-excited field coils for producing the primary control flux and the main field or forcing coils, these machines are usually equipped with compensating field coils on some or all of the main field poles and have commutation coils on the interpoles; and it is also known to provide additional field windings on the main poles for self-excitation.

My invention relates especially to the design and operation of the commutation coils on the interpoles of the above-mentioned type machines and has for its main object to reduce the space requirements of the interpole coils and coil terminals without incurring detrimental effects on the commutation conditions of the machines.

More specifically, and for the purpose just mentioned, it is an object of my invention to achieve satisfactory commutation with the aid of fewer coil units and coil terminals than were heretofore believed necessary.

In the known machines of the type here referred to, each interpole is equipped with a number of coil units equal to the number of main poles or commutator brushes of the machine. For instance, the four-pole machines according to the above-mentioned patents have four brushes and are equipped with four commutation coils on each of the four interpoles, thus requiring a total of sixteen coil units on the interpoles. The four coils of each interpole are connected to the four respective brushes so that the resultant commutation field is a function of the four currents traversing the four brushes; and this has been considered a necessity because, in contrast to conventional generators or exciters, the four brush currents of the type machines here in point are normally not balanced, but differ from one another depending upon the intensity of the input signal and the unbalance of flux distribution caused thereby.

According to the invention, and referring to the just-mentioned example of a four-pole machine otherwise designed as disclosed in the above-mentioned patents, I obtain similar commutation conditions by using only three coil units on each interpole and connecting them to three respective brushes so that three coil units are semiconnected to each of the four brushes of the machine. In order to achieve optimum results, one of the three coil units connected to each brush, in accordance with another feature of my invention, has about twice as many turns as the two other units and is so connected that its field is of the same direction as that of one of the other units and in opposition to that of the remaining unit as regards excitation by the brush current. That is, if the total number of turns is 2T, the three coil units have approximately the turn numbers and field polarities $$+\frac{T}{2}, +T, -\frac{T}{2}$$

This provision of three coils to perform the function of four is based on the recognition that, while the four brush or armature-circuit currents are normally different from one another, one of these currents can always be expressed as a function of the three others. Hence, and as will be explained below more in detail, three coil units if properly designed in accordance with the invention, are in fact always equivalent to four as far as the resultant commutation field is concerned, thus affording the desired reduction in total coil space and end connections as well as a corresponding simplification in the wiring of the machine without any detriment to the commutating performance.

It should be understood, however, that the above-mentioned turn ratio of 1:2:1 does not take into account that, for optimum performance, the armature reactance voltage in the commutated armature coil should be compensated. To this end, the total number of turns on each interpole is preferably somewhat larger than that required merely to compensate for the armature reaction ampere turns. Therefore, in accordance with another feature of my invention, I provide additional commutation turns in the following manner: If C represents the total number of additional turns required for each interpole to commutate a desired armature current, then I distribute the total number of compensation and commutation turns $(2T + C)$ in the proportion:

$$\frac{T+C}{2}, +\frac{2T+C}{2}, -\frac{T}{2}$$

Hence, for best results, the turn numbers of the three coil units are all different from one another so that the basic proportion of 1:2:1 is only approximately maintained.

The invention will be more fully understood from the following description of the embodiments shown in the drawings, in which.

Figure 1:
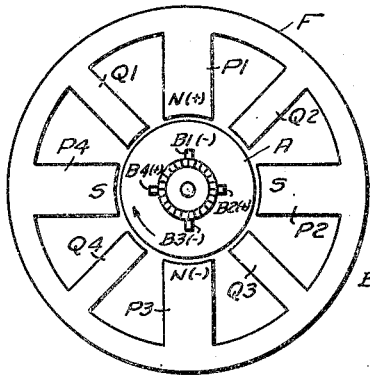
Figure 1 illustrates schematically the magnetic frame, armature and commutator structure of a four-pole machine according to the invention.
Figure 2:
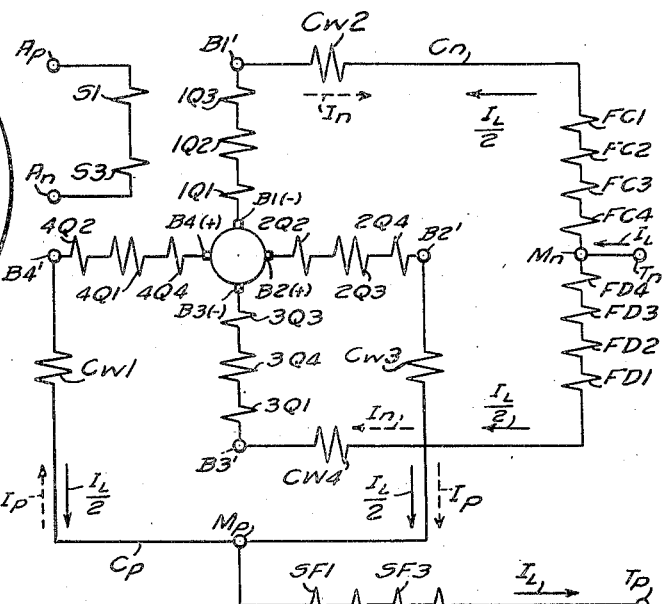
Fig. 2 is an example of a circuit diagram for operation of the same machine as a double-stage amplifier.
Figure 3:
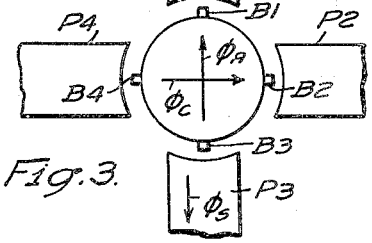
Figure 4:
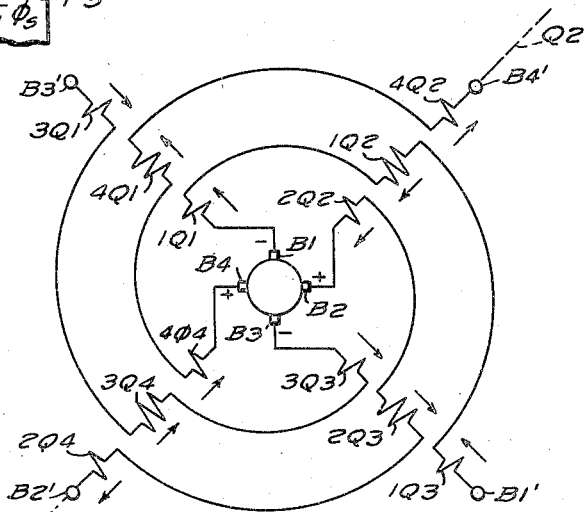
Figure 5:
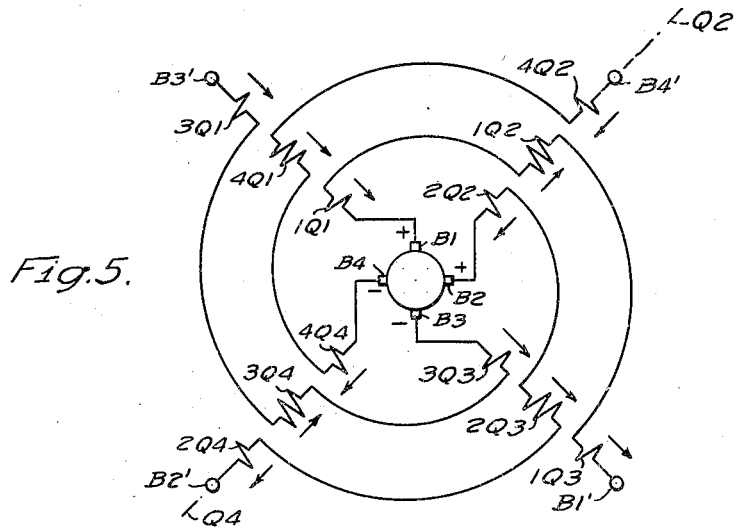
Figure 6:
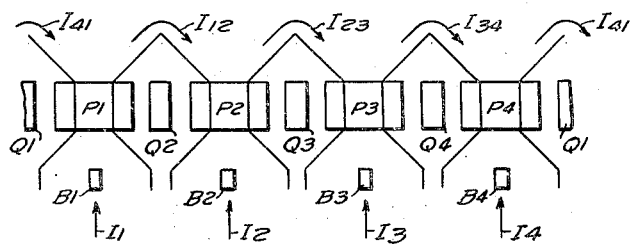
Figure 7:
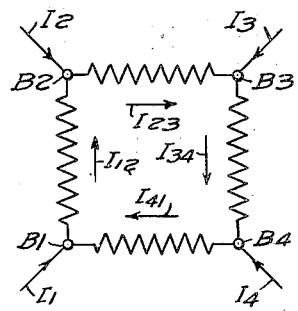

Fig. 3 is explanatory of certain magnetic flux conditions occurring in a machine according to Figs. 1 and 2; and Figs. 4 and 5 represent diagrammatically and under two different operating conditions the interpole coils of the same machine; and Figs. 6 and 7 are explanatory diagrams relating to the embodiment of Figs. 1 to 5.

As shown in Figure 1, the field structure F of the machine has four symmetrically arranged main poles P1, P2, P3, P4 and four interpoles Q1, Q2, Q3, Q4. A lap-wound armature A, wound in the manner normal for four-pole machines, except that the customary armature cross connections are not used, has its commutator equipped with four brushes B1, B2, B3, B4. With the armature running clockwise, as indicated by an arrow, and the main poles excited by the forcing coils described below, the faces of poles P1 and P3 have north polarity, while poles P2 and P4 are south poles. Brushes B1 and B3 are then electrically negative, while brushes B2 and B4 have positive potentials relative to the output or load circuit of the machine.

The field windings and circuits inductively associated with the poles and interpoles of the machine will now be described with reference to Fig. 2.

Eight main field windings, hereafter called "forcing coils," are arranged in pairs on the four main poles. Coils FC1 and FD1 are located on pole P1, coils FC2 and FD2 on pole P2, coils FC3 and FD3 on pole P3, and coils FC4 and FD4 on pole P4. These coils have preferably equal turns. They are all series-connected in an internal machine circuit Cn which extends between the brushes B1 and B3. The midpoint Mn of this circuit is attached to one of the output or load terminals Tn.

The four interpoles are equipped with a total of twelve commutation coils of which those denoted by 1Q1, 3Q1 and 4Q1 are located on pole Q1, while coils 1Q2, 2Q2, 4Q2 are mounted on pole Q2, coils 1Q3, 2Q3, 3Q3 on pole Q3, and coils 2Q4, 3Q4 and 4Q4 on pole Q4. The arrangement of these coils relative to the four interpoles is apparent from Fig. 4 or 5. The coils 1Q1, 1Q2, 1Q3 are attached to brush B1, and the coils 3Q3, 3Q4, 3Q1 to brush B3 in series-connection with one another in the above-mentioned circuit Cn of the eight forcing coils. This circuit includes further two compensating coils CW2 and CW4 disposed on poles P2 and P4 respectively. It will be recognized that the circuit Cn has two branches between point Mn and each of brushes B1 and B3, and that each branch contains half the number of forcing coils, interpole coils and compensating coils of circuit Cn. When the machine is in operation, the total ampere turns and resistance values of the two branches are balanced. The function of the compensating coils CW2 and CW4 will be explained in a later place.

The interpole coils 2Q2, 2Q3, 2Q4 are attached to brush B2 and connected in another internal machine circuit Cp in series relation to coils 4Q2, 4Q1, 4Q4 which are attached to brush B4. Circuit Cp contains also two compensating coils CW1 and CW3 which are disposed on poles P1 and P3 respectively and located on opposite sides of the midpoint Mp. The two branches of circuit Cp between the point Mp and the two brushes B2 and B4 are also balanced as regards total turns and resistance values. The second output or load terminal Tp of the machine is connected to midpoint Mp. For certain applications, the machine may also be equipped with self-exciting field windings as exemplified by series-field windings SF1, SF2, SF3, SF4 on poles P1, P2, P3, P4, respectively.

The input circuit of the machine extends between terminals Ap and An across which the voltage to be amplified is to be impressed. This circuit includes two signal or control field coils S1 and S3 on poles P1 and P3, respectively. When excited by signal voltage, the control coils magnetize the field poles P1 and P3 differentially relative to each other. For instance, a signal voltage which causes coil S1 to strengthen the north pole P1 will simultaneously weaken the north pole P3. Since the forcing coils are arranged on all four main poles so that their respective fluxes are balanced, the main component of field excitation due to the forcing coils has a symmetrical flux distribution and thus tends to produce equal electric potentials at negative brushes B1 and B3, and equal potentials at positive brushes B2 and B4. The asymmetrical superposition of the flux components induced in poles P1 and P3, however, causes a corresponding distortion in the distribution of the resultant flux. As a result, the excitation of the control coils S1 and S3 has the effect of producing a proportional difference in the potentials of the equipolar (negative) brushes B1 and B3 and, as will be explained below, also a difference in the potentials of equipolar (positive) brushes B2 and B4. The signal-excited voltage thus produced between brushes B1 and B3 drives a circulating current In through the circuit Cn. Similarly, another circulating current Ip is forced through the circuit Cp between brushes B2 and B4. The current In, which may be considered to represent the output current of the first amplifying stage of the generator, excites the forcing coils and thus provides the balanced four-pole field excitation above-referred to. The voltage generated by this forcing field between the two brush pairs and appearing across the mid-points Mn and Mp is impressed across the output terminals Tn and Tp of the second amplifying stage. The machine thus behaves like a cascade connection of two separate generators, provided the magnetic system operates along the straight or unsaturated portion of its magnetic characteristic. Hence the machine has an extremely high amplification factor, but since the two stages of amplification involve only one magnetic field and armature system, the magnetic delays involved in the amplifying performance are only those of a single machine so that the generator achieves a considerably greater speed of response and a higher accuracy than obtainable with a plurality of machines aside from the advantage of greatly reduced space requirements.

The interconnection of the above-mentioned forcing coils is such that the two coils on each pole, for instance coils FC1 and FD1 on pole P1, act cumulatively under excitation by the circulating current In in circuit Cn. When a load is connected across output terminals Tn and Tp, the load current IL, flowing from terminal Tn to brushes B1 and B3, and from brushes B2 and B4 to terminal Tp, traverses also the forcing coils. However, due to the above-described distribution of the forcing coils over the two branches of circuit Cn, the two forcing coils of each pole, for instance again coils FC1 and FD1 on pole P1, act differentially relative to the load current. That is, the fields of the two forcing coils of each pole balance and cancel each other relative to the load current IL. Consequently, the main field excitation of the machine is not affected by the load and is caused only by internal circulating current under control by the input-excited control coils S1 and S3.

The above-mentioned circulating currents In, Ip, and the load current IL, or part of the latter, flow also through the compensating coils and interpole coils and produce the effects explained below.

The control flux $\phi$s (see Fig. 3) induced in poles P1 and P3 by the control coils S1 and S3 has not only the effect of producing between brushes B1 and B3 the voltage difference needed to drive current In through circuit Cn, but it is also the cause of an armature reaction flux $\phi$c which extends at a right angle to the axis of poles P1 and P3 and remains stationary, thus magnetizing the poles P2 and P4 secondarily in much the same way as the poles P1 and P3 are magnetized by the control coils. This is the reason why, as mentioned above, a voltage difference appears also between brushes B2 and B4 and causes the flow of circulating current Ip. The magnetization of poles P2 and P4 has the further effect of inducing an armature reaction flux $\phi$A (Fig. 3) which extends stationarily in the pole axis P1—P3 in the opposite direction to the control flux $\phi$s. Therefore, the reaction flux $\phi$A weakens the control flux, and it is apparent that for best results the detrimental flux $\phi$A or its weakening effect should be reduced as much as possible.

The compensating coils CW1 and CW3 on poles P1 and P3 respectively, when excited by circulating current Ip, produce a field which is in direct opposition to the detrimental reaction flux $\phi$A and varies in proportion to the voltage difference between brushes B2 and B4 and hence in proportion to the cross magnetization in the pole axis P2—P4 which causes the flux $\phi$A. In principle, compensating coils in the axis P1—P4 and excited by circulating current between brushes B2 and B4, can be made to suffice for a virtually complete suppression of the detrimental reaction effects. However, another way of compensation, exemplified by coils CW2 and CW4 is to reduce the flux $\phi$c which causes the detrimental flux $\phi$A. To this end, coils CW2 and CW4 on poles P2 and P4, are connected to brushes B1 and B3. Thence, in the embodiment shown in Fig. 2, the flux $\phi$A is reduced by virtue of coils CW2 and CW4 and the reduced flux is rendered ineffective by the action of coils CW1 and CW3. In this manner a 100% effective compensation can be obtained at optimum utilization of coil space.

As is explained in the above-mentioned applications Serial No. 607,440 and Serial No. 682,188, the coils for compensating the detrimental armature reaction can be arranged in pairs in the above-explained manner of the forcing coils so that these coils produce a field only under excitation by circulating currents but have no magnetizing effects due to load current. In the embodiment of Fig. 2, however, each main pole has only one compensating coil, and these coils have equal turns in accordance with the disclosure of the co-pending application of B. Litman, Serial No. 685,109, filed July 20, 1946, now Patent 2,445,788, and assigned to the assignee of the present invention. This particular design of the compensating coils has the function of super-imposing on the above-explained compensating field a balanced magnetization of all four main poles in response and proportion to the load current. This magnetization is in the nature of a self-excitation so that the coils CW1, CW2, CW3, CW4 perform also part of the function otherwise assigned to the self-exciting series windings SF1, SF2, SF3, and SF4. It should be understood that this way of providing self-excitation is not an essential characteristic of the present invention. As a matter of fact, the invention is applicable to machines with or without self-excitation and is equally suitable in conjunction with self-excitation by series windings, shunt windings, the above-described special compensating windings, or a purposely unbalanced rating of the two forcing coils, such as FC1 and FD1, of each pole, or combinations of these different possibilities. If desired, any such self-excitation may be "tuned" so that the resistance or air gap line of the field system coincides approximately with the unsaturated or straight portion of the no-load magnetization characteristic of the machine. It is essential, however, that the field coils on the interpoles of a machine of the illustrated type be designed in the manner shown in Figs. 2, 4 and 5 and described in detail hereinafter.

Each of the interpole coils 1Q2, 2Q3, 3Q4 and 4Q1 has approximately twice the number of turns of each of the other interpole coils. Fairly good results can be obtained if an accurate 2:1 ratio is chosen, but a better performance is obtained by unbalancing the number of turns so that, as explained previously, each of coils 1Q2, 2Q3, 3Q4, 4Q1 has $$\frac{2T+C}{2}$$

turns, while coils 1Q1, 2Q2, 3Q3, 4Q4 have $$\frac{T+C}{2}$$

turns each, and coils 3Q1, 4Q2, 1Q3, 2Q4 have $$\frac{T}{2}$$

turns each. As is apparent from Fig. 2, each of the circuit branches B1—B1', B2—2', B3' and B4—B4' contains one coil of each of the three coil groups, and the three coils of each circuit branch are located on three different interpoles (Fig. 4).

The polarities of connection of the interpole coils are chosen in accordance with the arrows shown in Fig. 4. These arrows represent the directions of the flux induced by the respective coils in the appertaining interpoles due to the high current of a loaded machine under zero excitation of its control coils S1, S3. Under these conditions, the circulating currents $In$ and $Ip$ are both zero and the load current IL has a finite value. The polarities of coil connections in Fig. 4 are in accordance with the requirement previously mentioned. That is, the polarities or magnetomotive-force directions of the two smaller coils of each circuit are of opposite polarity. Hence, if the two smaller coils have equal turns $$\frac{(T)}{2}$$

they balance each other so that the resultant interpole flux is determined by the larger coil (T). If the coils are rated in accordance with the proportion $$+\frac{T+C}{2}:+\frac{2T+C}{2}:-\frac{T}{2}$$

the resultant flux in each interpole is determined by the algebraic sum which is also equal to the value $(T+C)$. The resultant ampere turns of each interpole therefore amounts to $$\frac{IL}{2}(T+C)$$

Hence, the interpole produces flux in both commutation axes and this flux is symmetrically distributed in accordance with the symmetrically balanced forcing or self-excited fields that produce the load current to be commutated. Thus, the interpole coils, under the special operating conditions here under observation, satisfy the requirements of proper commutation.

Under the opposite limit conditions, that is with excited control coils under no-load operation, the same coil arrangement behaves in accordance with the arrows indicating the respective magnetomotive-force directions in Fig. 5. It will be observed from Fig. 2 that the circulating currents $In$ and $Ip$ have the same direction as the load current in one branch of each internal circuit $Cn$, $Cp$, and flow in opposition to the load current in the other branch of the same circuit. Hence, when the load current is zero while currents $In$ and $Ip$ have finite values, the fluxes induced by the circulating currents in the interpole coils of the circuit branches B2—B2' and B3—B3' as shown in Fig. 2 will have the same directions as under excitation by load current. Consequently, the coils 2Q2, 2Q3, 2Q4 and 3Q3, 3Q4, 3Q1 in Fig. 5 are given arrows of the same direction as the corresponding arrows in Fig 4. On the other hand, since the flow of circulating current in circuit branches B1—B1' and B4—4' is reversed relative to the flow of load current, the flux directions of coils 1Q1, 1Q2, 1Q3 and 4Q4, 4Q1, 4Q2, in Fig. 2 is opposed to the corresponding directions indicated in Fig. 4. In approximation, the circulating currents $In$ and $Ip$ can be assumed to be of the same magnitude at zero load current. Then, the entire armature produces a resultant magnetomotive force in the axis Q1—Q3 and no flux in the axis Q2—Q4. Accordingly, the magnetomotive force directions of all interpole coils in the axis Q1—Q3 (Fig. 5) are now the same. Each of poles Q1 and Q3 has now a resultant number of effective turns equal to $2T$ or $2T+C$. The two smaller coils on each of poles Q2 and Q4, however, oppose the larger coil so that the resultant number of effective turns is zero.

Under the two limit conditions represented by Figs. 4 and 5, therefore, the interpole coil design according to the invention affords satisfactory commutation conditions. Under intermediate conditions, the above-discussed phenomena are superimposed on each other and approximate the desired optimum conditions to the same degree as obtainable with four instead of three commutation coils on each interpole. It has been mentioned that this result of having three coils on each pole perform the function of the four coils heretofore necessary is based on the fact that the current in one of the armature circuits between the four brushes can be considered as a function of the other three simultaneous armature currents and that the coil design according to my invention provides the coil ratings and polarities required for having three currents produce the resultant effect of four.

While this is borne out by the foregoing explanation in conjunction with Figs. 1 through 5, a more thorough understanding will be gained from the mathematical considerations presented below with reference to Figs. 6 and 7. Fig. 6 shows schematically the layout of some of the armature-coils of a four-pole lap-wound armature of the type used in machines according to the invention. Only one coil per armature circuit is shown and the four coils are abnormally chorded so as to prevent confusing crossovers. The brush currents are schematically indicated by arrows I1, I2, I3, I4 (without intention of thereby denoting the actual directions), and the armature currents are similarly denoted by I12, I23, I34, I41, respectively. A simplified scheme showing the same circuits and currents is represented in Fig. 7. The arrows shown in Fig. 7 point in the direction assumed to be positive in the following calculation.

The four brush- or line-currents are in general different from one another. Referring to the example of Fig. 2, for instance, the current values are:

$$I1=\frac{IL}{2}-In$$

$$I2=-\frac{IL}{2}-Ip$$

$$I3=\frac{IL}{2}+In$$

$$I4=Ip-\frac{IL}{2}$$

Since each brush-current is equal and opposite to the other three, as $-I4+I1+I2+I3$, the currents in the four armature circuits (Fig. 7) are:

$$I12=\tfrac{1}{4}I1-\tfrac{1}{2}I2-\tfrac{1}{4}I3$$
$$I23=\tfrac{1}{4}I2-\tfrac{1}{2}I3-\tfrac{1}{4}I4$$
$$I34=\tfrac{1}{4}I3-\tfrac{1}{2}I4-\tfrac{1}{4}I1$$
$$I41=\tfrac{1}{4}I4-\tfrac{1}{2}I1-\tfrac{1}{4}I2$$

The net armature-current (IP1, IP2, IP3, IP4) flowing under the respective faces of poles P1, P2, P3, P4 are:

$$IP1=I12-I41=\tfrac{3}{4}I1-\tfrac{1}{4}I2-\tfrac{1}{4}I3-\tfrac{1}{4}I4=I1$$
$$IP2=I23-I12=I2$$
$$IP3=I34-I23=I3$$
$$IP3=I41-I34=I4$$

Since there are four different brush or pole face currents, four coils per commutating pole will give a solution for the most general case. If these four coils on each interpole have the number of turns N1, N2, N3, N4, respectively, then the net ampere turns on the four respective interpoles are:

$$NQ1 = N1I1 + N2I2 + N3I3 + N4I4$$
$$NQ2 = N4I1 + N1I2 + N2I3 + N3I4$$
$$NQ3 = N3I1 + N4I2 + N1I3 + N2I4$$
$$NQ4 = N2I1 + N3I2 + N4I3 + N1I4$$

In the circuit according to Fig. 7, one of the four armature currents is determined by the three others. Hence, one can, for instance, set $$I2 = -I3 - I4 - I1$$

The total ampere turns on the respective interpoles can then be expressed as follows:

$$NQ1 = (N1-N2)I1 + (N3-N2)I3 + (N4-N2)I3$$
$$NQ2 = (N4-N1)I1 + (N2-N1)I3 + (N3-N1)I4$$
$$NQ3 = (N3-N4)I1 + (N1-N4)I3 + (N2-N4)I4$$
$$NQ4 = (N2-N3)I1 + (N4-N3)I3 + (N1-N3)I3$$

The sum (S) of the ampere turns along the one flux path extending through interpole Q1, armature, interpole Q2 and frame amounts to:

$$S = NQ1 - 2IP1T - NQ2 = NQ1 - 2I1T - NQ2$$

if T represents one-half of the ampere turns of pole P1. Substituting in the last equation the value for NQ1 and NQ2 leads to $$S = (N1-N2)I1 + (N3-N2)I3 + (N4-N2)I4 - 2TI1 - (N4-N1)I1 - (N2-N1)I3 - (N3-N1)I4$$
$$S = (2N1-N2-N4-2T)I1 + (N1-2N2+N3)I3 + (N1-N2-N3+N4)I4 = 0$$

The turns required for each interpole coil to obtain zero commutation pole flux can now be determined by setting the last equation equal to zero. Since the currents I1, I3, I4 are not zero in the general case of operation, the equation becomes zero only if each of the parenthetical terms is set zero as presented below:

$$2N1 - N2 - N4 - 2T = 0$$
$$N1 - 2N2 + N3 = 0$$
$$N1 - N2 - N3 + N4 = 0$$

Since in accordance with the invention only three coils 1Q1, 3Q1, 4Q1 are disposed on interpole Q1 to be traversed by the three currents I1, I3, I4 respectively, the value of N2 is to be set equal to zero. Relative to interpole Q1, therefore the last group of equations appears now as:

$$2N1 - N4 - 2T = 0$$
$$N1 + N3 = 0$$
$$N1 - N3 + N4 = 0$$

Solving these equations leads to the following three numbers of turns for respective coils 1Q1, 3Q1, 4Q1:

$$N1 = \frac{T}{2}; N3 = -\frac{T}{2}; N4 = -T$$

This result is in accordance with the basic coil ratio stated previously in this specification.

As mentioned above, it is preferable to unbalance the basic coil ratio by adding a total number (C) of times to the coils of each interpole in order to compensate for the armature reaction ampere turns. To determine the number of additional turns for each coil, the current changes ($I1'$, $I2'$, $I3'$, $I4'$) under each commutating pole must be considered:

$$I1' = I41 - I34 - (I12 - I41) = I4 - I1 = -2I1 - I2 - I3$$
$$I2' = I1 - I2$$
$$I3' = I2 - I3$$
$$I4' = I1 + I2 + 2I3$$

The net ampere turns $NQ1$, $NQ2$ additionally required on poles Q1 and Q2, respectively, for obtaining the desired compensation can be written, in analogy to the equations above-presented for NQ1 and NQ2, as follows:

$$NQ1 = N1I1 + N2I2 + N3I3 + N4I4$$
$$NQ2 = N4I1 + N1I2 + N2I3 + N3I4$$

It can be derived from the latter two groups of equations that the sum (s) of the required additional compensating ampere turns along the flux path through interpole Q1, armature, interpole Q2 and frame corresponds to $$s = (n1 - 2n4 + n3)I1 + (n3 + n2 - n1 - n4)I2 + (2n3 - n4 - n2)I3$$

Setting the total additional turns on each interpole equal to C as determined by balanced load conditions, the ampere turns required for the just mentioned path are $$s = (I1' - I2')\frac{C}{2} = \frac{3C}{2}I1 + \frac{C}{2}I3$$

It follows that the following equation should be satisfied:

$$\left(n1 - 2n4 + n3 - \frac{3C}{2}\right)I1 + (n3 + n2 - n1 - n4)I2 + \left(2n3 - n4 - n2 - \frac{C}{2}\right)I3 = 0$$

Hence, each of the parenthetical expressions should be zero:

$$n1 - 2n4 + n3 - \frac{3C}{2} = 0$$
$$n3 + n2 - n1 - n4 = 0$$
$$2n3 - n4 - n2 - \frac{C}{2} = 0$$

Setting $n2 = 0$ in analogy to the preceding considerations to obtain the additional turn number for the three coils of each interpole:

$$n1 - 2n4 + n3 - \frac{3C}{2} = 0$$
$$n3 - n1 - n4 = 0$$
$$2n3 - n4 - \frac{C}{2} = 0$$

It results from these three equations that:

$$n1 = \frac{C}{2}, n3 = 0, n4 = -\frac{C}{2}$$

Hence, the total number of turns should be $$N1 + n1 = \frac{T + C}{2}$$

for coil 1Q1, $$N3 + n3 = -\frac{T}{2}$$

for coil 1Q3, and $$N4 + n4 = -\frac{2T + C}{2}$$

for coil 1Q4, as set forth previously.

The considerations for the coils on the three other interpoles are analogous and lead to similar results.

While the examples specifically described deal with concentrated coils on the interpoles, it will be understood that the principles explained in the foregoing are also applicable to distributed pole-face windings with the same result of reducing the number of coil units so that, for instance, in a four-pole machine only three pole-face windings are connected to each brush instead of the four windings otherwise necessary. When machines as described above are to be equipped with pole-face compensating windings in addition to the concentrated interpole coils, these compensating windings may be wound by replacing commutating turns by equivalent distributed pole face turns. As a result, three pole-face windings per brush would be used, all of equal size and having a number of turns corresponding to $T/2 \times a\%$, wherein $a\%$ represents the percentage of armature turns compensated.

The invention is not limited to four-pole double-stage amplifying machines, but is also applicable to generators and motors of a different number of poles or stages, for instance, to the various modifications disclosed in the above-mentioned applications Serial No. 607,440 and Serial No. 682,188. That is, since in such machines, one of the brush currents can be regarded to be a function of the others, the application of the present invention to such machines permits generally the use of $N-1$ commutation coils on each interpole, if N represents the number of brushes, thus reducing the amount of insulation and total coil space, as well as the number of terminal connections required for the interpole coil units. It will therefore be understood that the invention permits various modifications and embodiments within the scope of its principles and without departure from the essential features set forth in the claims annexed hereto.

I claim as my invention:

1. A rotary electric machine, comprising a field structure having a plurality of field poles, an armature having a commutator with an equal plurality of brushes, and an equal plurality of groups of commutation windings, each of said groups having a lesser plurality of winding coils equal to said first-mentioned plurality minus one, said coils of each group being connected to one of said respective brushes and disposed to act on different commutation points relative to said commutator.

2. A rotary electric machine, comprising a field structure with four field poles, an armature having a commutator with four brushes, and four groups of commutation windings, each of said groups having three winding units series-connected to one of said respective brushes and disposed to act on three different respective commutation points of said commutator.

3. A rotary electric machine, comprising a field structure having a plurality of pole pairs, field windings on said pole pairs for energizing them so that the field poles have sequentially alternating north and south polarities respectively, an armature having a commutator with the same plurality of pairs of brushes of sequentially alternating positive and negative electric polarities respectively, a plurality of circuit connections each disposed to interconnect like-polarity brushes respectively, a load circuit attached to said connections, control means inductively associated with said field structure for producing an unbalanced distribution of the currents flowing through said brushes, and a plurality of groups of commutation windings equal to said plurality of brushes and associated with said field structure, each of said groups having a lesser plurality of winding units equal to the first-mentioned plurality minus one, said winding units of each group being series connected to one of said respective brushes to form part of said appertaining circuit connection, and said winding units of each of said groups being disposed to improve commutation at different axes of said brushes.

4. A rotary electric machine, comprising a field structure having a plurality of field poles, and an equal plurality of interpoles, an armature having a commutator with an equal plurality of brushes, and an equal plurality of groups of commutation windings, each of said groups having a lesser plurality of winding coils equal to said first-mentioned plurality minus one, said coils of each group being connected to one of said respective brushes and disposed on different axes of said interpoles.

5. A rotary electric machine, comprising a field structure with four field poles and four interpoles, an armature having a commutator with four brushes, and four groups of commutation windings, each of said groups having three winding units series-connected to one of said respective brushes and disposed on different axes of said interpoles.

6. A rotary electric machine, comprising a field structure having an even plurality of field poles of sequentially different magnetic polarities respectively, an armature having a commutator with the same plurality of brushes arranged to have sequentially different electric polarities respectively, field means capable of producing an unbalanced flux distribution in said field poles, circuit connections disposed between equipolar brushes respectively to be traversed by currents of whose distribution is unbalanced due to said unbalanced flux distribution, a circuit attached to said connections to be impressed by the voltage difference between said connections, and a plurality of commutation coil groups equal to said plurality of brushes, each of said group having a lesser plurality of coils equal to said first-mentioned plurality minus one, said coils of each group being series-connected to one of said respective brushes to form part of said appertaining circuit connection and being arranged on different axes of said interpoles.

7. In a rotary machine as set forth in claim 6, said coils on said interpoles being rated and arranged so that the coils on each interpole have the same turn ratio and mutual polarities as those on each of the other interpoles, said coils being rated and connected for producing on each interpole the same total number of effective turns due to excitation by current flowing in said circuit at balanced flux distribution in said field poles.

8. A rotary electric machine, comprising a field structure with four field poles of sequentially different magnetic polarities and four interpoles, an armature having a commutator with four brushes of sequentially different electric polarities, two circuit connections disposed between respective pairs of equipolar brushes, field exciting means associated with said field poles and capable of imposing a controlled unbalance on the flux distribution in said field poles to cause circulating currents to flow in said connections, a circuit attached to said two connections, and four groups of commutation coils each group having three coils series-arranged in one of said connections between one of the appertaining two brushes and the point of attachment of said circuit, said three coils of each group being arranged on three different interpoles, the turn ratio of the coils in each group and on each interpole being about $$\frac{T}{2} : T : \frac{T}{2}$$

wherein T is the total number of turns of said coils, and said two coils having the smaller number of turns on each interpole being poled to oppose each other when said flux distribution is balanced.

9. A rotary electric machine, comprising a field structure with four field poles of sequentially different magnetic polarities and four interpoles, an armature having a commutator with four brushes of sequentially different electric polarities, two circuit connections disposed between respective pairs of equipolar brushes, field exciting means associated with said field poles and capable of imposing a controlled unbalance on the flux distribution in said field poles to cause circulating currents to flow in said connections, a circuit attached to said two connections, and four groups of commutation coils, each group having three coils series-arranged in one of said connections between one of the appertaining two brushes and the point of attachment of said circuit, said three coils of each group being arranged on three different interpoles, the turn ratio of the three coils in each group and on each interpole being substantially $$\frac{T+C}{2}:\frac{2T+C}{2}:\frac{T}{2}$$

wherein T is the total number of compensating turns and C the total number of additional commutation turns of each interpole, and said coils being arranged with such polarities of connection that the number of resultant effective turns is substantially equal to $T+C$ for each interpole when the unbalance of said flux distribution is zero.

10. A plural-stage amplifying generator, comprising a field structure with four field poles of sequentially different magnetic polarities and four interpoles, an armature having a commutator with four brushes of sequentially different electric polarities, two circuit connections disposed between respective pairs of like-polarity brushes, forcing coils arranged in one of said connections and disposed on said field poles for producing in said structure a flux of symmetrical distribution, control coils disposed on only some of said field poles for superimposing on said structure a control flux of unbalanced distribution in order to cause circulating current to flow through said forcing coils, an output circuit attached to said connections so as to be impressed by amplified voltage due to said symmetrical flux distribution, and four groups of commutation coils, each group having three coils series-arranged in one of said connections between one of the appertaining two brushes and the point of attachment of said circuit, said three coils of each group being arranged on three different interpoles, the turn ratio of the coils on each group and on each interpole being about $$\frac{T}{2}:T:\frac{T}{2}$$

and said coils being connected so as to produce on each interpole the number of about T effective turns when said control flux is zero.

11. A plural-stage amplifying generator, comprising a field structure with four field poles of sequentially different magnetic polarities and four interpoles, an armature having a commutator with four brushes of sequentially different electric polarities, two circuit connections disposed between respective pairs of equipolar brushes, forcing coils arranged in one of said connections and disposed on said field poles for producing in said structure a flux of symmetrical distribution, control coils disposed on only some of said field poles for superimposing on said structure a control flux of unbalanced distribution in order to cause circulating current to flow through said forcing coils, an output circuit attached to said connections so as to be impressed by amplified voltage due to said symmetrical flux distribution, and four groups of commutation coils, each group having three coils series-arranged in one of said connections between one of the appertaining two brushes and the point of attachment of said circuit, said three coils of each group being arranged on three different interpoles, the turn ratio of the three coils in each group and on each interpole being substantially $$\frac{T+C}{2}:\frac{2T+C}{2}:\frac{T}{2}$$

wherein T is the total number of commutation turns and C the total number of additional compensating turns of each interpole, and said coils being arranged with such polarities of connection that the number of resultant effective turns is substantially equal to $T+C$ for each interpole when said control flux is zero.

GURNEY L. GODWIN.

No references cited.